(12) United States Patent
Amstutz

(10) Patent No.: US 8,793,978 B2
(45) Date of Patent: Aug. 5, 2014

(54) EXHAUST SYSTEM HAVING THERMALLY CONDUCTIVE DOSING CHANNEL

(75) Inventor: Aaron K. Amstutz, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 806 days.

(21) Appl. No.: 13/021,229

(22) Filed: Feb. 4, 2011

(65) Prior Publication Data

US 2012/0198823 A1 Aug. 9, 2012

(51) Int. Cl.
*F01N 3/10* (2006.01)
*F01N 3/20* (2006.01)

(52) U.S. Cl.
CPC .................................. *F01N 3/2066* (2013.01)
USPC ............................................. 60/286; 30/303

(58) Field of Classification Search
CPC .............................. F01N 26/102; F01N 3/2066
USPC ..................................................... 60/286, 303
See application file for complete search history.

(56) References Cited

U.S. PATENT DOCUMENTS

| | | | |
|---|---|---|---|
| 5,087,272 A * | 2/1992 | Nixdorf ............................. | 95/20 |
| 5,286,467 A * | 2/1994 | Sun et al. ................... | 423/239.1 |
| 7,448,206 B2 | 11/2008 | Meingast et al. | |
| 7,481,986 B2 | 1/2009 | Gabrielsson et al. | |
| 2008/0041036 A1* | 2/2008 | Witte-Merl ...................... | 60/282 |
| 2008/0092526 A1* | 4/2008 | Kunkel et al. ................... | 60/286 |
| 2009/0107119 A1 | 4/2009 | Driscoll et al. | |

FOREIGN PATENT DOCUMENTS

| | | |
|---|---|---|
| DE | 102007048560 | 4/2009 |
| EP | 0555746 | 8/1993 |
| EP | 1712756 | 10/2006 |
| EP | 1781908 | 5/2007 |
| JP | 2008014213 | 1/2008 |
| JP | 2008075527 | 4/2008 |
| JP | 2009167965 | 7/2009 |
| JP | 2009299544 | 12/2009 |

* cited by examiner

*Primary Examiner* — Kenneth Bomberg
(74) *Attorney, Agent, or Firm* — Finnegan, Henderson, Farabow, Garrett & Dunner LLP

(57) ABSTRACT

An exhaust system for use with a combustion engine is disclosed. The exhaust system may have an exhaust passage, a reduction catalyst disposed within the exhaust passage, and an injection device configured to inject reductant into the exhaust passage upstream of the reduction catalyst. The exhaust system may also have a dosing channel forming a portion of the exhaust passage. The dosing channel may have a thermal conductivity different than adjacent upstream and downstream portions of the exhaust passage and extend a distance upstream of the injection device sufficient to transfer enough heat to an extension of the dosing channel downstream of the injection device to cause vaporization of reductant that impinges on the downstream extension.

18 Claims, 2 Drawing Sheets

EXHAUST SYSTEM HAVING THERMALLY CONDUCTIVE DOSING CHANNEL

TECHNICAL FIELD

The present disclosure is directed to an exhaust system and, more particularly, to an exhaust system having a thermally conductive dosing channel.

BACKGROUND

Internal combustion engines, including diesel engines, gasoline engines, gaseous fuel-powered engines, and other engines known in the art exhaust a complex mixture of air pollutants. These air pollutants are composed of gaseous compounds, such as the oxides of nitrogen ($NO_x$). Due to increased awareness of the environment, exhaust emission standards have become more stringent and the amount of $NO_x$ emitted from an engine may be regulated depending on the type of engine, size of engine, and/or class of engine. In order to ensure compliance with the regulation of these compounds, some engine manufacturers have implemented a strategy called Selective Catalytic Reduction (SCR).

SCR is a process where gaseous or liquid reductant (most commonly a solution of urea solid and water) is added to the exhaust gas stream of an engine and adsorbed onto a downstream catalyst. The reductant decomposes into ammonia ($NH_3$), which reacts with $NO_x$ in the exhaust gas to form $H_2O$ and $N_2$ that can be safely released to the atmosphere. Although SCR can be an effective method for reducing $NO_x$, the introduction of reductant into the exhaust gas stream can be problematic in some situations. For example, when the reductant is introduced into a relatively cool portion of an exhaust passage, byproducts of the reductant such as cyanuric acid, biuret, and melamine can be deposited on walls of the passage near an introduction site. These deposits can cause exhaust flow and/or reductant blockage, which can lead to degradation of the $NO_x$ conversion process and engine performance.

One attempt to reduce deposit buildup associated with the SCR process is described in European Patent Specification 1,781,908 of Kuenkel et al. that published on Mar. 31, 2010 (the '908 publication). The '908 publication discloses an arrangement for supplying a reducing medium into an exhaust gas of an internal combustion engine. The arrangement includes an exhaust line and a tubular element fitted inside the exhaust line to create a first exhaust passage through the tubular element and a second exhaust passage between an outer surface of the tubular element and an inner surface of the exhaust line. The tubular element is made of a material having good heat conducting properties such that heat from the second exhaust passage is transferred to the tubular element to insulate the tubular element from a cooling action of the environment and to maintain the tubular element at a vaporization point of the medium injected into the first exhaust passage. In an alternative embodiment, the tubular element is omitted and a portion of the exhaust line at the reductant injection location is instead fabricated from a material having high thermally insulating properties to reduce the cooling action of the environment at the injection site.

Although perhaps somewhat effective at reducing the formation of reductant deposits, the system of the '908 publication may still be less than optimal. In particular, the tubular element of the '908 publication extends only downstream from the reductant introduction site. In this embodiment, the entire tubular element may be continuously cooled by the introduction of reductant and only a limited amount of heat may be transferred into the tubular element. In the alternative embodiment, only insulation is relied on to inhibit deposit formation, which may be insufficient under some conditions.

The exhaust system of the present disclosure solves one or more of the problems set forth above and/or other problems of the prior art.

SUMMARY

One aspect of the present disclosure is directed to an exhaust system for use with a combustion engine. The exhaust system may include an exhaust passage, a reduction catalyst disposed within the exhaust passage, and an injection device configured to inject reductant into the exhaust passage upstream of the reduction catalyst. The exhaust system may also include a dosing channel forming a portion of the exhaust passage. The dosing channel may have a thermal conductivity different than adjacent upstream and downstream portions of the exhaust passage and extend a distance upstream of the injection device sufficient to transfer enough heat to an extension of the dosing channel downstream of the injection device to cause vaporization of reductant that impinges on the downstream extension.

Another aspect of the present disclosure is directed to another exhaust system. This exhaust system may include an exhaust passage, a reduction catalyst disposed within the exhaust passage, and an injection device configured to inject reductant into the exhaust passage upstream of the reduction catalyst. The reductant may be selected to facilitate within the reduction catalyst a reduction of an exhaust constituent. The exhaust system may also include a dosing channel forming a portion of the exhaust passage to receive an entire flow of exhaust passing through the exhaust passage. The dosing channel may have a thermal conductivity greater than the adjacent upstream and downstream portions of the exhaust passage.

DETAILED DESCRIPTION

Figure 1:
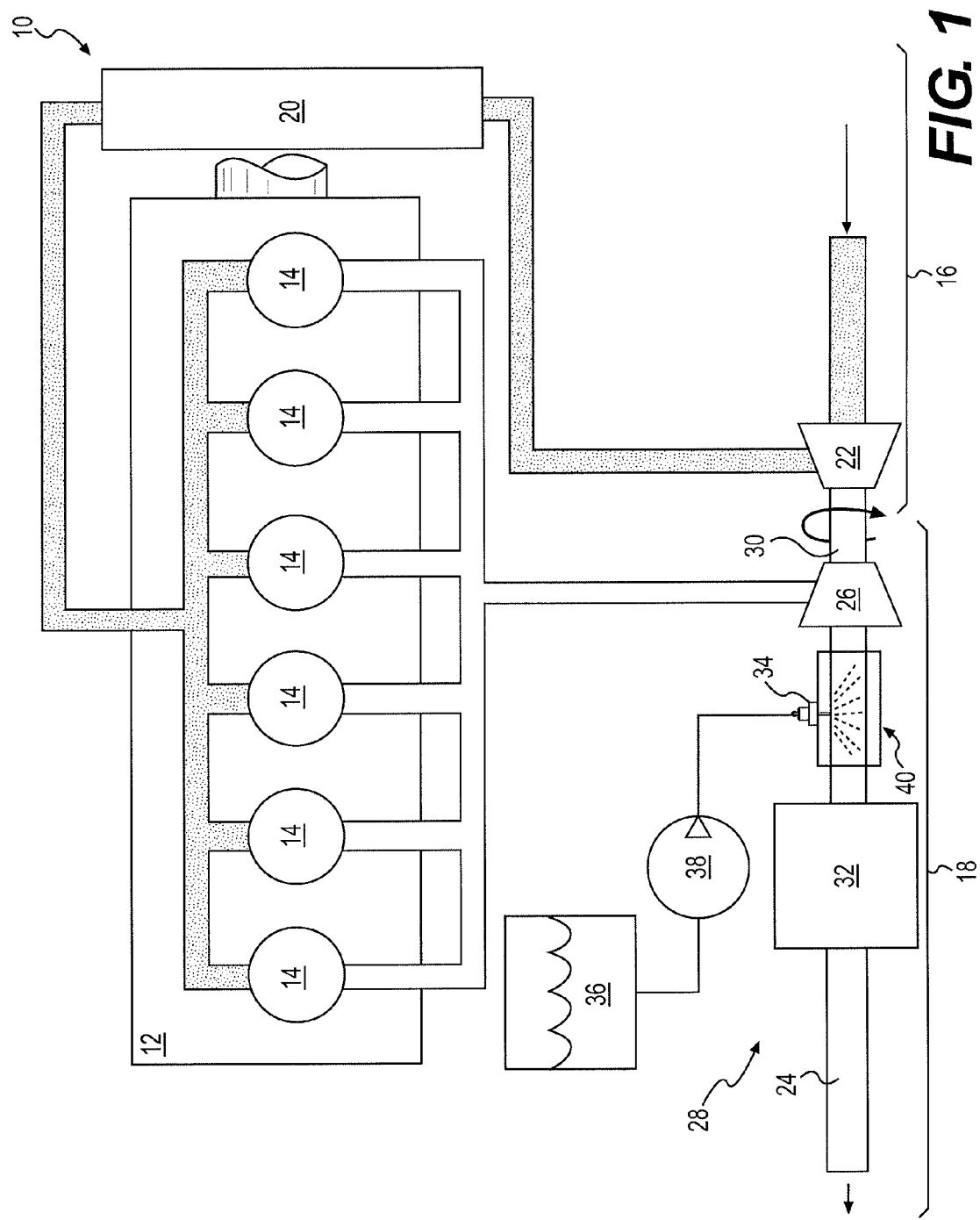
FIG. 1 is a diagrammatic illustration of an exemplary disclosed power system.

FIG. 1 illustrates an exemplary power system 10. For the purposes of this disclosure, power system 10 is depicted and described as a diesel-fueled, internal combustion engine. However, it is contemplated that power system 10 may embody any other type of combustion engine such as, for example, a gasoline engine or a gaseous fuel-powered engine burning compressed or liquefied natural gas, propane, or methane. Power system 10 may include an engine block 12 that at least partially defines a plurality of combustion chambers 14. It is contemplated that power system 10 may include any number of combustion chambers 14 and that combustion chambers 14 may be disposed in an "in-line" configuration, a "V" configuration, or in any other conventional configuration.

Multiple separate sub-systems may be included within power system 10. For example, power system 10 may include an air induction system 16 and an exhaust system 18. Air induction system 16 may be configured to direct air or an air and fuel mixture into combustion chambers 14 of power system 10 for subsequent combustion. Exhaust system 18 may exhaust byproducts of the combustion to the atmosphere.

Air induction system 16 may include multiple components that cooperate to condition and introduce compressed air into combustion chambers 14. For example, air induction system 16 may include an air cooler 20 located downstream of one or more compressors 22. Compressors 22 may be connected to pressurize inlet air directed through cooler 20. A throttle valve (not shown) may be located upstream and/or downstream of compressors 22 to selectively regulate (i.e., restrict) the flow of inlet air into power system 10. A restriction of the inlet air may result in less air entering power system 10 and, thus, affect an air-to-fuel ratio of power system 10. It is contemplated that air induction system 16 may include different or additional components than described above such as, for example, variable valve actuators associated with each combustion chamber 14, filtering components, compressor bypass components, and other known components that may be controlled to affect the air-to-fuel ratio of power system 10, if desired. It is further contemplated that compressors 22 and/or cooler 20 may be omitted, if a naturally aspirated power system 10 is desired.

Exhaust system 18 may include multiple components that condition and direct exhaust from combustion chambers 14 to the atmosphere. For example, exhaust system 18 may include an exhaust passage 24, one or more turbines 26 driven by exhaust flowing through passage 24, and a reduction catalyst 28 fluidly connected within exhaust passage 24 at a location downstream of turbines 26. It is contemplated that exhaust system 18 may include different or additional components than described above such as, for example, bypass components, an exhaust compression or restriction brake, an attenuation device, additional exhaust treatment devices, and other known components, if desired.

Each turbine 26 may be located to receive exhaust discharged from combustion chambers 14, and may be connected to one or more compressors 22 of air induction system 16 by way of a common shaft 30 to form a turbocharger. As the hot exhaust gases exiting power system 10 move through turbine 26 and expand against vanes (not shown) thereof, turbine 26 may rotate and drive the connected compressor 22 to pressurize inlet air. In one embodiment, turbine 26 may be a variable geometry turbine (VGT) or include a combination of variable and fixed geometry technology. VGTs are a type of turbine having geometry adjustable to attain different aspect ratios, such that adequate boost pressure may be supplied by the connected compressor 22 to combustion chambers 14 under a range of operational conditions. As a flow area of turbine 26 changes, the air-to-fuel ratio and thus the performance of power system 10 may also change. Alternatively, a fixed geometry turbine having an electronically controlled wastegate may be included, if desired.

Reduction catalyst 28 may receive exhaust from turbine 26 and reduce constituents of the exhaust to innocuous gases. In one example, reduction catalyst 28 may embody a Selective Catalytic Reduction (SCR) device having a catalyst substrate 32 located downstream from an injection device 34. A pressurized gaseous or liquid reductant, most commonly urea $(NH_2)_2CO$, may be advanced into the exhaust upstream of catalyst substrate 32 by injection device 34. In the disclosed embodiment, the reductant may be sprayed radially inward from injection device 34 into the exhaust passing through passage 24. It is contemplated, however, that injection device 34 may alternatively be configured to advance the reductant axially into the flow of exhaust in passage 24, if desired. An onboard reductant supply 36 and a pressurizing device 38 may be associated with injection device 34 to provide the pressurized reductant. As the injected reductant is injected and decomposes into ammonia $(NH_3)$, it may be adsorbed onto a surface of catalyst substrate 32 and react with NOx (NO and $NO_2$) in the exhaust gas to form water $(H_2O)$ and diatomic nitrogen $(N_2)$. The reduction process performed by catalyst 32 may be most effective when a concentration of NO to $NO_2$ supplied to reduction catalyst 32 is about 1:1.

To help provide the correct concentration of NO to $NO_2$, an oxidation catalyst (not shown) may be located upstream of reduction catalyst 32, in some embodiments. The oxidation catalyst may be, for example, a diesel oxidation catalyst (DOC). The DOC may include a porous ceramic honeycomb structure or a metal mesh substrate coated with a material, for example a precious metal, that catalyzes a chemical reaction to alter the composition of the exhaust. Specifically, the DOC could include palladium, platinum, vanadium, or a mixture thereof that facilitates the conversion of NO to $NO_2$. In some embodiments, the oxidation catalyst could also perform particulate trapping functions (i.e., the oxidation catalyst could be a catalyzed particulate trap such as a continuously regenerating trap (CRT) or a catalyzed continuously regenerating trap (CCRT)), as desired.

During operation of power system 10, it may be possible for too much urea to be injected into the exhaust (i.e., urea in excess of an amount required for appropriate $NO_X$ reduction). In this situation, known as "ammonia slip", some amount of ammonia may pass through catalyst substrate 32 to the atmosphere, if not otherwise accounted for. To reduce the magnitude of ammonia slip, another oxidation catalyst (not shown) may be located downstream of reduction catalyst 32, if desired. This additional oxidation catalyst could include a substrate coated with a catalyst that oxidizes residual $NH_3$ in the exhaust to form water and diatomic nitrogen.

Figure 2:
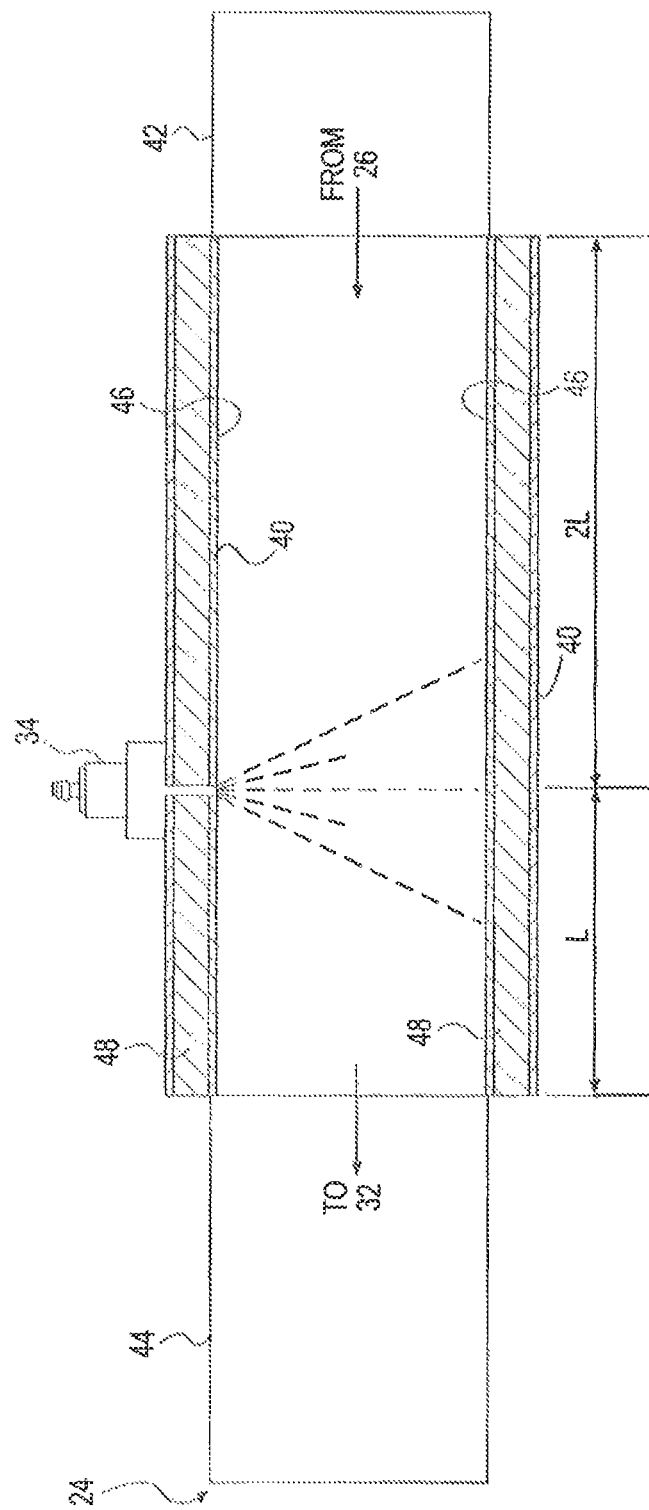
FIG. 2 is a cross-sectional illustration of an exemplary disclosed dosing channel that may be used with the power system of FIG. 1.

As shown in FIG. 2, injection device 34 may be an injector positioned generally transverse to the flow of exhaust through passage 24 and disposed within a side wall of a dosing channel 40 that forms an integral portion of exhaust passage 24. Dosing channel 40 may have an internal diameter about equal to internal diameters of adjacent upstream and downstream portions 42, 44 of exhaust passage 24, and be configured to receive the entire exhaust flow of passage 24. Dosing channel 40 may extend upstream of injection device 34 and/or a reductant injection site of exhaust passage 24 a distance at least one-half of a distance "L" that dosing channel 40 extends downstream of injection device 34. In one embodiment, dosing channel 40 may extend upstream of injection device 34 farther than in the downstream direction, for example twice as far. This upstream extension distance may facilitate heat transfer from hotter upstream regions of exhaust passage 24 to a reductant impingement surface of the downstream extension. The reductant impingement surface may be a surface specifically intended for impingement by reductant or, alternatively, simply a portion of exhaust passage 24 that reductant happens to impinge under some conditions. The upstream extension may be sufficient to transfer enough heat to the downstream extension to cause vaporization of any reductant that impinges on the downstream extension. It has been found that an upstream extension less than about one-half of the downstream extension may provide too little heat transfer, while an upstream extension that is more than twice the downstream extension may not be cost effective and provide little additional heat transfer.

Dosing channel 40 may be fabricated from a material that is different than one or both of upstream and downstream portions 42, 44. Specifically, dosing channel 40 may be fabricated from a material having a greater thermal conductivity ($\lambda$). For example, dosing channel 40 may be fabricated from aluminum (λ≈250 W/mK), copper (λ≈400 W/mK), or a copper alloy such as a copper/nickel alloy (λ≈50 W/mK), while upstream and downstream portions 42, 44 may be fabricated from a lower cost material such as stainless steel (e.g., an iron/chromium alloy having λ≈20 W/mK). In the disclosed embodiment, the material selected for fabrication of dosing channel 40 may have a thermal conductivity at least two times greater than the thermal conductivity of the material selected for fabrication of upstream and/or downstream portions 42, 44. Dosing channel 40 may be joined to upstream and/or downstream portions 42, 44 in any manner known in the art, for example via welding, brazing, or mechanical fastening.

Dosing channel 40 may be internally coated with a thin layer 46 of material. In one embodiment, thin layer 46 may include an electroplating having improved corrosion resistance as compared to the thicker base material of dosing channel 40. For example, an electroplating of zinc, titanium, stainless steel, or other material may be applied to a base of aluminum, copper, or copper alloy. In this manner, dosing channel 40 may have relatively high thermal conductivity and yet retain sufficient corrosion resistance at an internal surface thereof. In another embodiment, thin layer 46 may include a hydrolytic catalyst coating configured to facilitate a breakdown of urea to ammonia gas that is subsequently used in the SCR process. The hydrolytic catalyst coating could include, for example, a metal oxide washcoat, a zeolite washcoat, or a combination of metal oxides and zeolite. It is contemplated that multiple thin layers 46 of material may be applied to the base material of dosing channel 40, for example an inner corrosion resistant layer and an outer hydrolytic catalyst coating that is in direct contact with exhaust, if desired.

Dosing channel 40 may also or alternatively be provided with an external layer 48 of material that thermally insulates dosing channel 40 from the environment to reduce cooling of dosing channel 40. In one embodiment, external layer 48 may be a thermal blanket draped around dosing channel 40. In another embodiment, external layer 48 may be a spray coating or an additional wall of a material having a lower thermal conductivity. It is contemplated that an air gap (not shown) may be maintained between dosing channel 40 and external layer 48, if desired, to improve insulation from the environment.

Industrial Applicability

The exhaust system of the present disclosure may be applicable to any power system having a reduction catalyst, where a diminution in reductant deposit formation is important. Deposit formation may be reduced by localized heating at a reductant introduction site and by decreasing an environmental cooling action at the introduction site. Operation of power system 10 will now be described.

Referring to FIG. 1, air induction system 16 may pressurize and force air or a mixture of air and fuel into combustion chambers 14 of power system 10 for subsequent combustion. The fuel and air mixture may be combusted by power system 10 to produce a mechanical work output and an exhaust flow of hot gases. The exhaust flow may contain a complex mixture of air pollutants composed of gaseous material, which can include oxides of nitrogen ($NO_X$). The exhaust flow may be directed through turbine 26 toward reduction catalyst 32, where the $NO_X$ in the presence of a reductant may be reduced to water and diatomic nitrogen. After reduction within catalyst 32, the exhaust may pass to the atmosphere.

Prior to reaching reduction catalyst 32, bursts of reductant may be selectively introduced into the exhaust flow by injection device 34. As shown in FIG. 2, the bursts of reductant may be radially introduced into dosing channel 40 at a general lengthwise mid-portion. Dosing channel 40, because of its length, location, and composition, may absorb heat from the exhaust passing therethrough and utilize this heat to reduce the likelihood of the reductant from cooling and depositing on surfaces of exhaust passage 24. Specifically, the extension length of dosing channel 40 upstream and downstream of injection device 34, in combination with its increased thermal conductivity, may cause dosing channel 40 to absorb significant amounts of heat from exhaust at the upstream and downstream locations. This absorbed heat, together with a reduction in the environmental cooling action provided by the insulative properties of external layer 48, may help to maintain the walls of dosing channel 40 above the vaporization temperature of the injected reductant.

Several advantages may be associated with power system 10. For example, because dosing channel 40 may extend both upstream and downstream of injection device 34, a significantly greater amount of heat may be absorbed by the walls of dosing channel 40 than if dosing channel 40 extended only downstream of injection device 34. In fact, the majority of the absorbed heat may be drawn from the upstream location. This large amount of absorbed heat may be due to the increased length of dosing channel 40 in the upstream direction, as well as to the generally hotter temperatures of the exhaust at the upstream location. That is, exhaust at the upstream location may have undergone less environmental cooling as compared to exhaust at the downstream location, and the injections of reductant within dosing channel 40 may function to further cool exhaust passing through the downstream location.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. An exhaust system, comprising:
   an exhaust passage;
   a reduction catalyst disposed within the exhaust passage;
   an injector configured to inject reductant into the exhaust passage upstream of the reduction catalyst; and
   a dosing channel forming a portion of the exhaust passage and providing an impingement surface for injected reductant,
   wherein:
   the dosing channel has a thermal conductivity different than adjacent upstream and downstream portions of the exhaust passage; and
   the dosing channel extends a distance upstream of the injector sufficient to transfer enough heat to an extension of the dosing channel downstream of the injector to cause vaporization of reductant that impinges on the downstream extension,
   wherein the distance that the dosing channel extends upstream of the infector is twice the distance that the dosing channel extends downstream of the injector.

2. The exhaust system of claim 1, wherein the dosing channel has a thermal conductivity at least two times greater than thermal conductivities of the adjacent upstream and downstream portions of the exhaust passage.

3. The exhaust system of claim 1, wherein the dosing channel is externally thermally insulated from an environment of the exhaust passage.

4. The exhaust system of claim 3, wherein the dosing channel is provided with a thermal blanket.

5. The exhaust system of claim 3, wherein the dosing channel includes a coating of a thermally insulating material.

6. The exhaust system of claim 1, wherein the dosing channel is fabricated from one of copper, aluminum, or copper/nickel alloy.

7. The exhaust system of claim 6, wherein the dosing channel includes an internal coating of a material other than copper, aluminum, or copper/nickel alloy.

8. The exhaust system of claim 7, wherein the internal coating is one of zinc, titanium, or nickel.

9. The exhaust system of claim 7, wherein the internal coating is a hydrolytic catalyst coating.

10. The exhaust system of claim 1, wherein the dosing channel has an internal diameter the same as internal diameters of the adjacent upstream and downstream portions of the exhaust passage.

11. An exhaust system, comprising:
an exhaust passage;
a reduction catalyst disposed within the exhaust passage;
an injector configured to inject reductant into the exhaust passage upstream of the reduction catalyst; and
a dosing channel forming a portion of the exhaust passage to receive an entire flow of exhaust passing through the exhaust passage, wherein:
the dosing channel has a thermal conductivity at least two times greater than the adjacent upstream and downstream portions of the exhaust passage; and
the distance that the dosing channel extends upstream of the injector is twice the distance that the dosing channel extends downstream of the injector.

12. The exhaust system of claim 11, wherein the dosing channel is externally thermally insulated from an environment of the exhaust passage.

13. The exhaust system of claim 11, wherein the dosing channel is fabricated from one of copper, aluminum, or copper/nickel alloy.

14. The exhaust system of claim 13, wherein the dosing channel includes an internal coating of a material other than copper, aluminum, or copper/nickel alloy.

15. The exhaust system of claim 14, wherein the internal coating is one of zinc, titanium, or nickel.

16. The exhaust system of claim 14, wherein the internal coating is a hydrolytic catalyst coating.

17. The exhaust system of claim 11, wherein the dosing channel has an internal diameter the same as internal diameters of the adjacent upstream and downstream portions of the exhaust passage.

18. A power system, comprising:
an internal combustion engine configured to combust fuel and generate a flow of exhaust;
an exhaust passage leading from the internal combustion engine to the atmosphere;
an SCR catalyst disposed within the exhaust passage;
an injector configured to inject a urea solution into the exhaust passage upstream of the SCR catalyst; and
a dosing channel forming a portion of the exhaust passage to receive an entire flow of exhaust passing through the exhaust passage,
wherein:
the dosing channel has an internal diameter the same as internal diameters of adjacent upstream and downstream portions of the exhaust passage;
the dosing channel has a thermal conductivity at least two times the thermal conductivities of the adjacent upstream and downstream portions of the exhaust passage;
the dosing channel extends a distance upstream of the injector twice a distance that the dosing channel extends downstream of the injector; and
the dosing channel is externally thermally insulated from an environment of the exhaust passage.

* * * * *

UNITED STATES PATENT AND TRADEMARK OFFICE
CERTIFICATE OF CORRECTION

| | | |
|---|---|---|
| PATENT NO. | : 8,793,978 B2 | Page 1 of 1 |
| APPLICATION NO. | : 13/021229 | |
| DATED | : August 5, 2014 | |
| INVENTOR(S) | : Aaron K. Amstutz | |

It is certified that error appears in the above-identified patent and that said Letters Patent is hereby corrected as shown below:

In the Specification,

Column 5, line 43, delete "Industrial Applicability" and insert -- INDUSTRIAL APPLICABILITY --.

In the Claims,

Column 5, line 58, in Claim 1, delete "infector" and insert -- injector --.

Signed and Sealed this
Fifteenth Day of September, 2015

Michelle K. Lee
*Director of the United States Patent and Trademark Office*